US012573843B2

(12) United States Patent
Hsu et al.

(10) Patent No.:  US 12,573,843 B2
(45) Date of Patent:       Mar. 10, 2026

(54) GaN-BASED SEMICONDUCTOR DEVICE AND ELECTROSTATIC DISCHARGE (ESD) CLAMP CIRCUIT

(71) Applicant: TAIWAN SEMICONDUCTOR MANUFACTURING COMPANY LTD., Hsinchu (TW)

(72) Inventors: Sheng-Fu Hsu, Hsinchu (TW); Shih-Fan Chen, Hsinchu (TW); Lin-Yu Huang, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 133 days.

(21) Appl. No.: 18/423,220

(22) Filed: Jan. 25, 2024

(65) Prior Publication Data

US 2025/0246903 A1      Jul. 31, 2025

(51) Int. Cl.
H02H 9/04              (2006.01)

(52) U.S. Cl.
CPC .................................... H02H 9/046 (2013.01)

(58) Field of Classification Search
CPC ....................................................... H02H 9/046
USPC ............................................................. 361/56
See application file for complete search history.

(56) References Cited

U.S. PATENT DOCUMENTS

| | | | | |
|---|---|---|---|---|
| 6,919,602 B2 * | 7/2005 | Lin | ....................... | H10D 89/811 |
| | | | | 361/111 |
| 8,072,722 B1 * | 12/2011 | Hwang | .................. | H02H 9/046 |
| | | | | 361/56 |
| 11,088,542 B1 * | 8/2021 | Langguth | ............... | H02H 9/005 |
| 11,670,941 B2 * | 6/2023 | Chen | .................. | H03K 17/0822 |
| | | | | 361/56 |
| 11,799,287 B2 * | 10/2023 | Sivakumar | ........... | H10D 89/819 |
| 11,876,089 B2 * | 1/2024 | Chen | ....................... | H02H 9/046 |
| 2011/0195744 A1 * | 8/2011 | Zhang | .................. | H02H 11/003 |
| | | | | 361/84 |
| 2013/0077195 A1 * | 3/2013 | Stockinger | ............. | H02H 9/046 |
| | | | | 361/56 |
| 2013/0258533 A1 * | 10/2013 | Chen | ....................... | H02H 9/046 |
| | | | | 361/56 |

(Continued)

FOREIGN PATENT DOCUMENTS

WO      WO-2006072292 A1 *   7/2006   ........... H10D 89/811

*Primary Examiner* — Dharti H Patel

(74) *Attorney, Agent, or Firm* — WPAT LAW; Anthony King

(57)                    ABSTRACT

The present disclosure provides a semiconductor device, which includes a control circuit, a driving circuit, a voltage pull-up device, and a discharging circuit. The control circuit is coupled between a first terminal and a second terminal of the integrated circuit, and provides a first voltage at a first node. The driving circuit is electrically connected to the control circuit at the first node, and provides a trigger signal at a second node in response to an electrostatic discharge (ESD) event occurring at the first terminal or the second terminal. The voltage pull-up device is coupled between the first terminal and the first node, and configured to pull up the first voltage at the first node in response to the ESD event occurring at the first terminal. The discharging circuit is electrically connected to the second node, and coupled between the first terminal and the second terminal.

20 Claims, 13 Drawing Sheets

300

(56) References Cited

U.S. PATENT DOCUMENTS

| | | | |
|---|---|---|---|
| 2015/0085406 A1* | 3/2015 | Chen | H02H 9/046 |
| | | | 361/55 |
| 2020/0251466 A1* | 8/2020 | Stockinger | H10D 89/819 |
| 2023/0148160 A1* | 5/2023 | Sivakumar | H02H 9/046 |
| | | | 361/56 |
| 2024/0332958 A1* | 10/2024 | Hung | H02H 9/041 |
| 2024/0372356 A1* | 11/2024 | Mysore Rajagopal | |
| | | | H05K 9/0067 |
| 2025/0038525 A1* | 1/2025 | Lee | H02H 9/046 |

* cited by examiner

GaN-BASED SEMICONDUCTOR DEVICE AND ELECTROSTATIC DISCHARGE (ESD) CLAMP CIRCUIT

BACKGROUND

The present disclosure relates to electronic circuits, and, in particular, to a GaN-based semiconductor device and an electrostatic discharge (ESD) clamp circuit.

An electrostatic discharge (ESD) event occurs when there is an energy transfer between two bodies with different electrostatic potentials, either through contact or via an ionized ambient discharge (a spark). This poses a risk to integrated circuits (ICs) connected to external ports, as they are vulnerable to ESD damaging pulses from the operating environment and peripherals. To protect the sensitive IC pad against ESD, it is necessary to connect an ESD clamp circuit or an ESD protection circuit between the main IC pad and its external port (e.g., I/O pads) to prevent damage from voltage overshot surge during component switching or electrostatic discharge surge.

BRIEF DESCRIPTION OF THE DRAWINGS

Aspects of the present disclosure are best understood from the following detailed description when read with the accompanying figures. It is emphasized that, in accordance with standard practice in the industry, various features are not drawn to scale. In fact, the dimensions of the various features can be arbitrarily increased or reduced for clarity of discussion.

DETAILED DESCRIPTION

Figure 1:
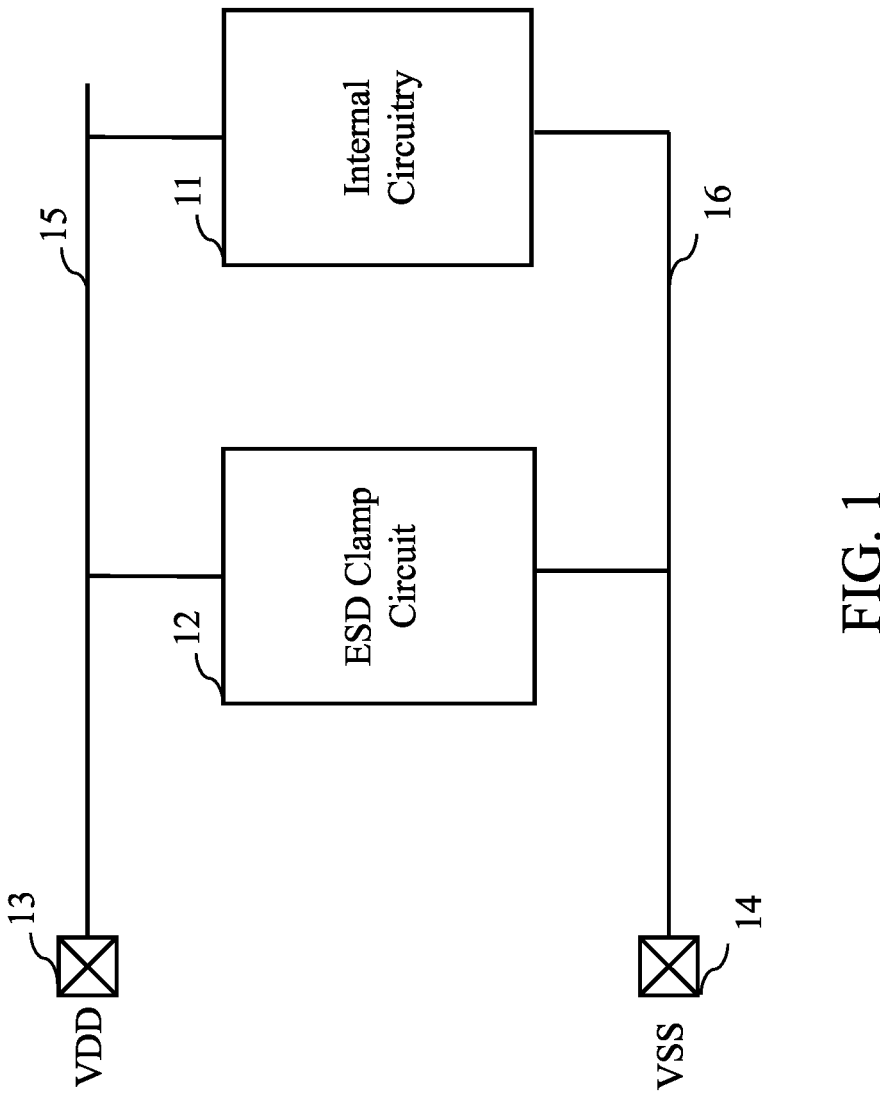
FIG. 1 is a simplified block diagram of an electrostatic discharge (ESD) protection system in accordance with an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features can be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "upper," "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Further, it will be understood that when an element is referred to as being "connected to" or "coupled to" another element, it can be directly connected to or coupled to the other element, or intervening elements can be present.

Embodiments, or examples, illustrated in the drawings are disclosed as follows using specific language. It will nevertheless be understood that the embodiments and examples are not intended to be limiting. Any alterations or modifications in the disclosed embodiments, and any further applications of the principles disclosed in this document are contemplated as would normally occur to one of ordinary skill in the pertinent art.

Further, it is understood that several processing steps and/or features of a device can be only briefly described. Also, additional processing steps and/or features can be added, and certain of the following processing steps and/or features can be removed or changed while still implementing the claims. Thus, it is understood that the following descriptions represent examples only, and are not intended to suggest that one or more steps or features are required.

In addition, the present disclosure may repeat reference numerals and/or letters in the various examples. This repetition is for the purpose of simplicity and clarity and does not in itself dictate a relationship between the various embodiments and/or configurations discussed.

In comparison with silicon-based metal-oxide-semiconductor field-effect transistors (silicon-based MOSFET), the GaN-based HEMTs exhibit a lower threshold voltage and smaller source-drain on-state resistance. These characteristics result in reduced gate driving power requirements and increased current and switching frequency capabilities. However, the low mobility of P-type HEMTs in integrated circuits manufactured using the GaN process necessitates the inclusion of enhance-mode N-type HEMTs and deple-tion-mode N-type HEMTs in ESD clamp circuits. Conse-quently, traditional ESD clamp circuits utilizing silicon-based PMOS and NMOS FETs are not compatible with GaN-based ESD clamp circuits.

FIG. 1 is a simplified block diagram of an electrostatic discharge (ESD) protection system in accordance with an embodiment of the present disclosure.

In some embodiments, the ESD protection system 10 may be disposed in an integrated circuit (IC) which is fabricated using a GroupIII-V process such as a GaN process. As depicted in FIG. 1, the ESD protection system 10 may include terminals 13 and 14, an ESD clamp circuit 12, and internal circuitry 11. Terminal 13 may be an input/output pad electrically connected to a power supply voltage having a higher voltage level, such as VDD. Terminal 14 may be an input/output pad electrically connected to another power supply voltage having a lower voltage level, such as VSS or GND. The power rails 15 and 16 may be electrically connected to terminals 13 and 14, respectively.

In some embodiments, the internal circuitry 11 may be functional circuitry of the integrated circuit. The ESD clamp circuit 12 and the internal circuitry 11 may be coupled between the power rails 15 and 16, and the ESD clamp circuit 12 can be considered as a shunting ESD clamp circuit to the internal circuitry 11. The power supply voltages VDD and VSS (or GND) can be provided to the ESD clamp circuit 12 and the internal circuitry 11.

The working principle of the ESD clamp circuit 12 is to rapidly conduct an ESD discharge current to the ground (e.g., VSS) to protect the internal circuitry 11 when an unexpected voltage spike (i.e., an ESD event) occurs at terminals 13 or 14 (e.g., I/O pads), and to be a non-conducting circuit when the ESD clamp circuit 12 is in a normal operating mode. For example, when an ESD event occurs at terminal 13 or 14, the ESD clamp circuit 12 may allow a large current caused by the ESD event to be discharged from terminal 13 to terminal 14, or from terminal 14 to terminal 13. Details of the ESD clamp circuit 12 will be described in the embodiment of FIG. 1B. In some embodiments, the ESD clamp circuit 12 may be imple-mented using a plurality of high-electron-mobility transis-tors (HEMTs). It should be noted that due to low mobility of P-type HEMTs, the HEMTs in the ESD clamp circuit 12 may include enhance-mode (E-mode) N-type HEMTs and deple-tion mode (D-mode) N-type HEMTs, the details of which will be described in various embodiments of FIGS. 2 to 9.

Figure 2:
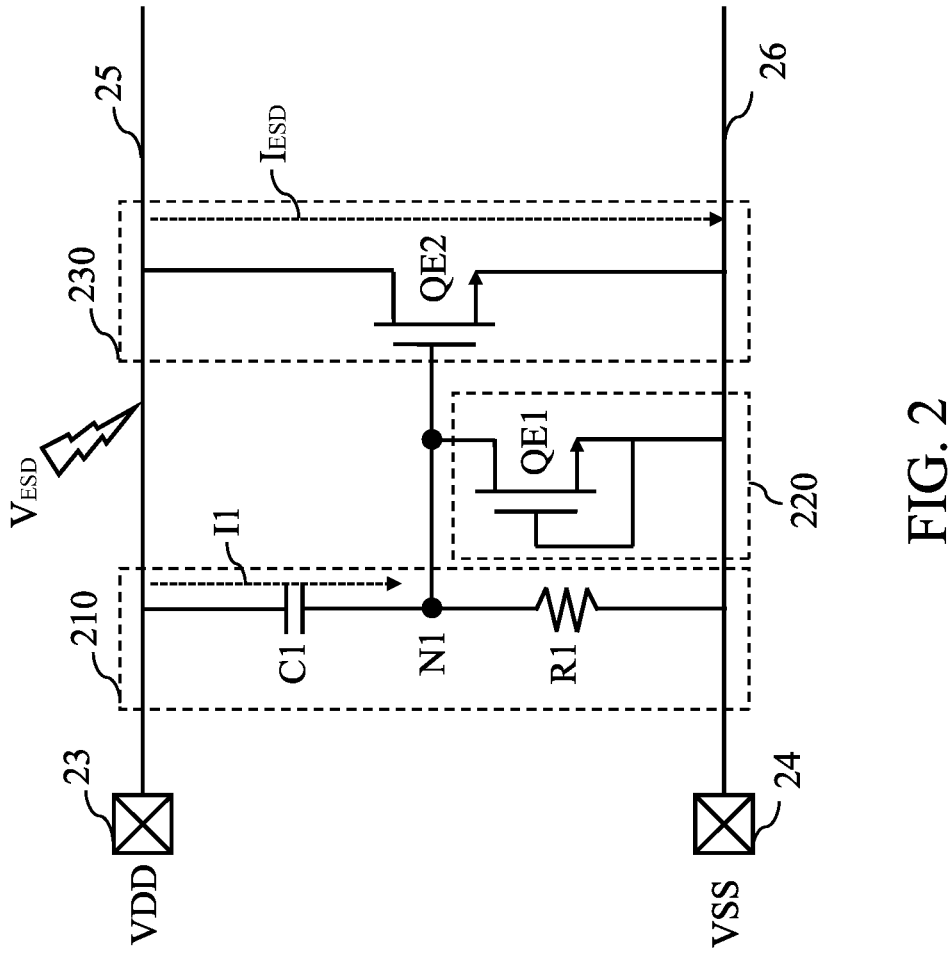
FIG. 2 is a schematic diagram of an ESD clamp circuit in accordance with an embodiment of the present disclosure.

FIG. 2 is a schematic diagram of an ESD clamp circuit in accordance with an embodiment of the present disclosure.

In some embodiments, the ESD clamp circuit 12 shown in FIG. 1 can be implemented by the ESD clamp circuit 200 shown in FIG. 2. As depicted in FIG. 2, the ESD clamp circuit 200 may include a trigger circuit 210, a rectifier 220, and a discharging circuit 230. The trigger circuit 210 may include a capacitor C1 and a resistor R1. The capacitor C1 may have a first terminal electrically connected to terminal 23 through power rail 25, and a second terminal electrically connected to node N1. The resistor R1 has a first terminal electrically connected to node N1, and a second terminal electrically connected to terminal 24 through power rail 26. The discharging circuit 230 may be implemented using an E-mode N-type HEMT (i.e., abbreviated as HEMT herein-after) QE2, which is also a big HEMT having a relatively larger channel width than other HEMTs in the ESD clamp circuit 200.

In some embodiments, the rectifier 220 may include an E-mode N-type HEMT QE1. The rectifier 220 may be coupled between node N1 and terminal 24. When the ESD clamp circuit 200 is in a normal DC operation mode, the trigger circuit 210 may be configured to disable the dis-charging circuit 230. In response to an ESD event (e.g., VESD) occurring at terminal 23 (or power rail 25), the trigger circuit 210 may be configured to provide a trigger signal (e.g., a gate bias voltage) to turn on the discharging circuit 230, so a discharging current IESD is conducted from terminal 23 to terminal 24 through the big HEMT QE2, thereby preventing the ESD event from damaging the inter-nal circuitry 11 shown in FIG. 1.

For example, when the ESD clamp circuit 200 is in the normal DC operation mode, terminals 23 and 24 are sup-plied with power supply voltage VDD and VSS, respec-tively. At this time, the capacitor C1 can be regarded as an open circuit, and thus the power supply voltage VDD will not be transferred to node N1. Because the big HEMT QE2 has a positive threshold voltage and the voltage at node N1 is electrically connected to the power supply voltage VSS, the big HEMT QE2 is turned off. When an ESD event occurs at terminal 23 (or power rail 25), a current I1 is conducted from the power rail 25 to the power rail 26 (e.g., ground) through the capacitor C1 and resistor R1. At this time, the rectifier 220 may be regarded as a diode with an anode at node N1 and a cathode on the power rail 26, and the current I1 will not flow through the rectifier 220. Given that w denotes the angular frequency of the ESD event (i.e., $V_{ESD}$), the voltage $V_{N1}$ at node N1 can be expressed using formula (1) as follows.

$$V_{N1} = V_{ESD} - \frac{1}{j\omega C1} \cdot I1 \tag{1}$$

More specifically, according to formula (1), the voltage $V_{ESD}$ at node N1 may be dependent on the capacitance of the capacitor C1. In other words, the higher frequency of the ESD event is, the lower the voltage $V_{N1}$ is. In comparison with the voltage $V_{ESD}$, a lower gate bias voltage (i.e., $V_{N1}$) is provided to the big HEMT QE2, and the big HEMT QE2 cannot be fully turned on. Therefore, the big HEMT QE2 is not able to provide a full-swing capability, resulting in a lower discharge current IESD from power rail 25 to power rail 26. As such, the big HEMT QE2 (e.g., a big HEMT) needs to be designed with a much larger size (e.g., width) in order to have a better on-resistance Ron, leading to area penalty of the integrated circuit.

Figure 3A:
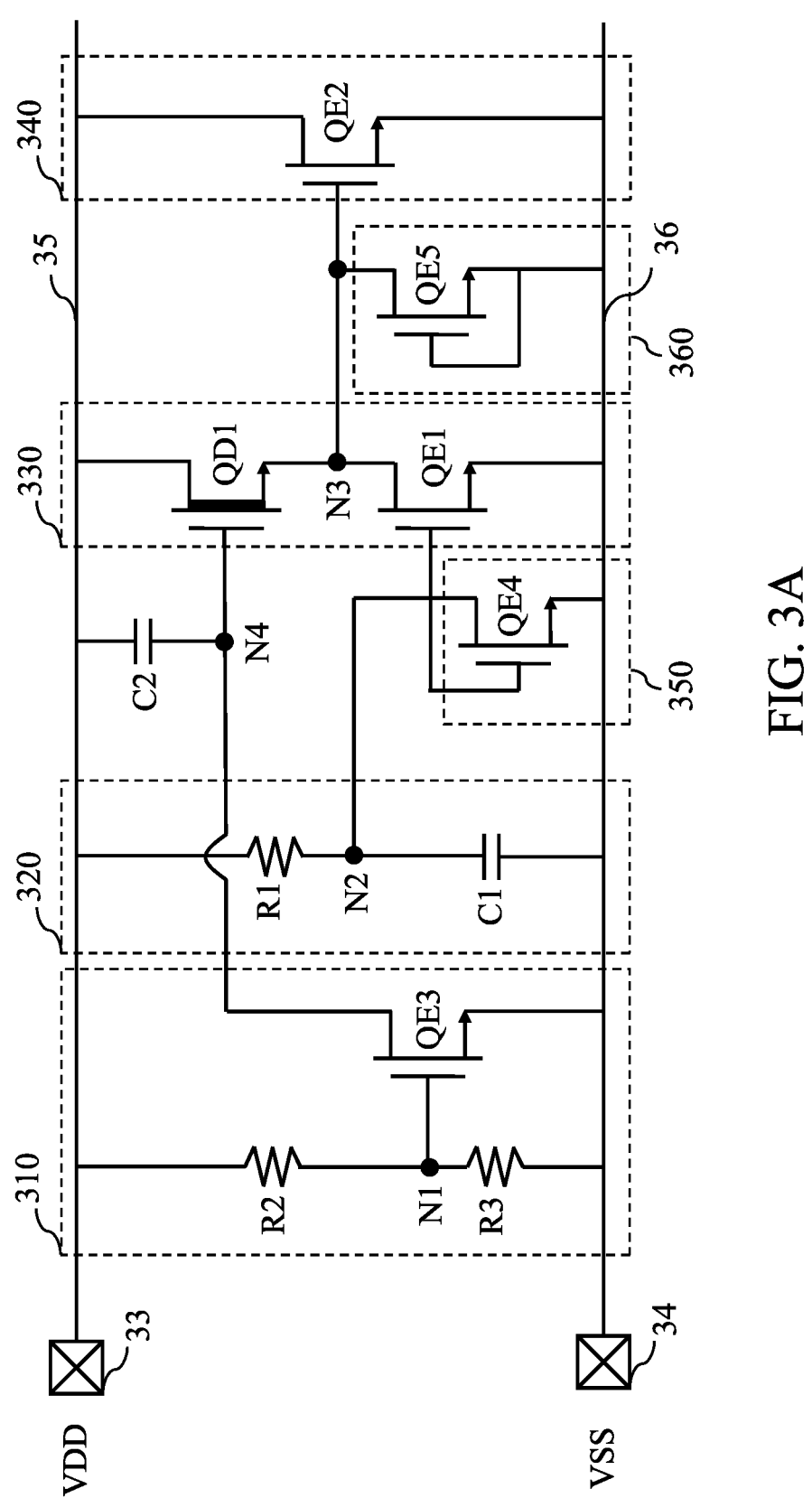
FIG. 3A is a schematic diagram of an ESD clamp circuit in accordance with another embodiment of the present disclosure.

FIG. 3A is a schematic diagram of an ESD clamp circuit in accordance with another embodiment of the present disclosure.

In some embodiments, the ESD clamp circuit 12 shown in FIG. 1 can be implemented using the ESD clamp circuit 300 shown in FIG. 3A. As depicted in FIG. 3A, the ESD clamp circuit 300 may include a control circuit 310, a trigger circuit 320, a driving circuit 330, a discharging circuit 340, a stack rectifier 350, and a rectifier 360. The driving circuit 330, which can be an active clamp, may include an E-mode N-type HEMT QE1 and a D-mode N-type HEMT QD1. QE1 and QD1 can also be referred to as a low-side HEMT and a high-side HEMT, respectively. It should be noted that the HEMT QD1 has a negative threshold voltage and remains in the ON state when its gate is connected to the ground voltage or left floating. However, when a negative voltage lower than its threshold voltage is applied to the gate of the HEMT QD1, the HEMT QD1 is turned off.

During the normal DC operation mode of the ESD clamp circuit 300, where the ESD clamp circuit 300 is supplied with power supply voltages VDD and VSS, the driving circuit 330 may be configured to provide a first bias voltage to turn off the discharging circuit 340. In addition, in response to an ESD event occurring at the terminal 33 or 34, the driving circuit 330 may be further configured to provide a second bias voltage to turn on the discharging circuit 340, the details of which will be discussed later.

The control circuit 310 may be configured to turn off the HEMT QD1 of the driving circuit 330 during the normal DC operation mode of the ESD clamp circuit 300. For example, the control circuit 310 may include a voltage divider which generates a bias voltage VN1 at node N1, which serves as the gate of the E-mode N-type HEMT QE3. By appropriately designing the resistances R2 and R3 of the voltage divider, the HEMT QE3 can be turned on when the ESD clamp circuit 300 is in the normal DC operation mode. Accordingly, the voltage at node N4 is pulled down to the power supply voltage VSS (e.g., a large negative voltage), thereby turning off the HEMT QD1.

In some embodiments, each of the resistors R1, R2, and R3 may be implemented using the two-dimensional electron gas (2DEG) between the AlGaN—GaN heterojunction of an HEMT that is fabricated using the GaN process in the front-end of line (FEOL) processing. Alternatively, the resistors R1, R2, and R3 may be implemented using silicon-chromium (SiCr) or titanium nitride (TiN) in the back-end of line (BEOL) processing, but the present disclosure is not limited thereto.

In some embodiments, each of the capacitors C1 and C2 may be implemented using an HEMT, that is fabricated using the GaN process in the FEOL processing, with its source and drain electrically connected. Alternatively, the capacitors C1 and C2 may be implemented using the metal-insulator-metal (MIM) or metal-oxide-metal (MOM) technique in the BEOL processing, but the present disclosure is not limited thereto.

In some embodiments, the big HEMT QE2 may have the largest total width among the HEMTs in the ESD clamp circuit 300. In addition, the HEMTs that are closer to the big HEMT QE2 may have a relatively large width. Allowing WQE1 to WQE5 to denote the total width of the HEMTs QE1 to QE5, the relationship between the total widths WQE1 to WQE5 can be expressed using formula (2) as follows:

$$WQE2 > WQE5 \cong WQE1 > WQE4 > WQE3 \quad (2)$$

For example, the total width WQE2 of the big HEMT QE2 may be approximately from 3000 μm to 20000 μm, but the disclosure is not limited thereto. The total width WQE5 of the HEMT QE5 may be approximately from 200 μm to 6000 μm. The total width WQE1 of the HEMT QE1 may be approximately from 100 μm to 1000 μm. The total width WQE4 of each rectifier stage may be approximately from 10 μm to 100 μm. The total width WQE3 of the HEMT QE3 may be approximately from 5 μm to 20 μm. Furthermore, the HEMT QD1 may have the smallest total width among the HEMTs in the ESD clamp circuit 300, and the total width WQD1 of the HEMT QD1 may be from 1 μm to 10 μm. It should be noted that the aforementioned ranges of the total widths of the HEMTs in the ESD clamp circuit 300 are illustrative, the present disclosure is not limited thereto.

During the normal DC operation mode of the ESD clamp circuit 300, the trigger circuit 320 may be configured to provide a gate bias voltage at node N2 to the HEMT QE1 of the driving circuit 330. For example, the trigger circuit 320 may be a resistance-capacitance (RC) trigger circuit, which includes a resistor R1 and a capacitor C1 that can be regarded as a high-side resistor and a low-side capacitor, respectively. The resistor R1 may include a first terminal electrically connected to terminal 33 through power rail 35, and a second terminal electrically connected to node N2. The capacitor C1 may include a first terminal electrically connected to node N2, and a second terminal electrically connected to terminal 34 through power rail 36.

In some embodiments, the stack rectifier 350 may be configured to clamp the gate bias voltage at node N2 to a specific voltage level during the normal DC operation mode of the ESD clamp circuit 300. This ensures that the gate-source voltage of the HEMT QE1 is limited to prevent damage to the HEMT QE1 when the ESD clamp circuit 300 is in the normal DC operation mode. The stack rectifier 350 may include one or more HEMTs (e.g., E-mode N-type HEMTs) arranged in a cascoded architecture, and each HEMT can be regarded as a rectifier stage. The number of rectifier stages in the stack rectifier 350 can be appropriately designed to match the threshold voltage of the HEMT QE1 of the driving circuit 330 during the normal DC operation mode of the ESD clamp circuit 300. For simplicity, one E-mode N-type HEMT QE4 is shown in FIG. 3A. It should be noted that both the gate and drain of the HEMT QE4 are connected to node N2, making the HEMT QE4 operate in a diode-connected configuration, or as a diode-connected HEMT. Additionally, each rectifier stage in the stack rectifier 350 can also be in the diode-connected configuration.

In some embodiments, the capacitor C2 may be coupled between terminal 33 and node N4 (i.e., gate of the HEMT QD1), and it may have a relatively small capacitance (e.g., measured in pF). The rectifier 360 may be a forward rectifier which includes an E-mode N-type HEMT QE5. Both the gate and source of the HEMT QE5 are electrically connected to terminal 34 through power rail 36. The rectifier 360 may be designed to rapidly turn on the big HEMT QE2 during negative zapping of an ESD event, indicating that the ESD event occurs at terminal 34.

Figure 3B:
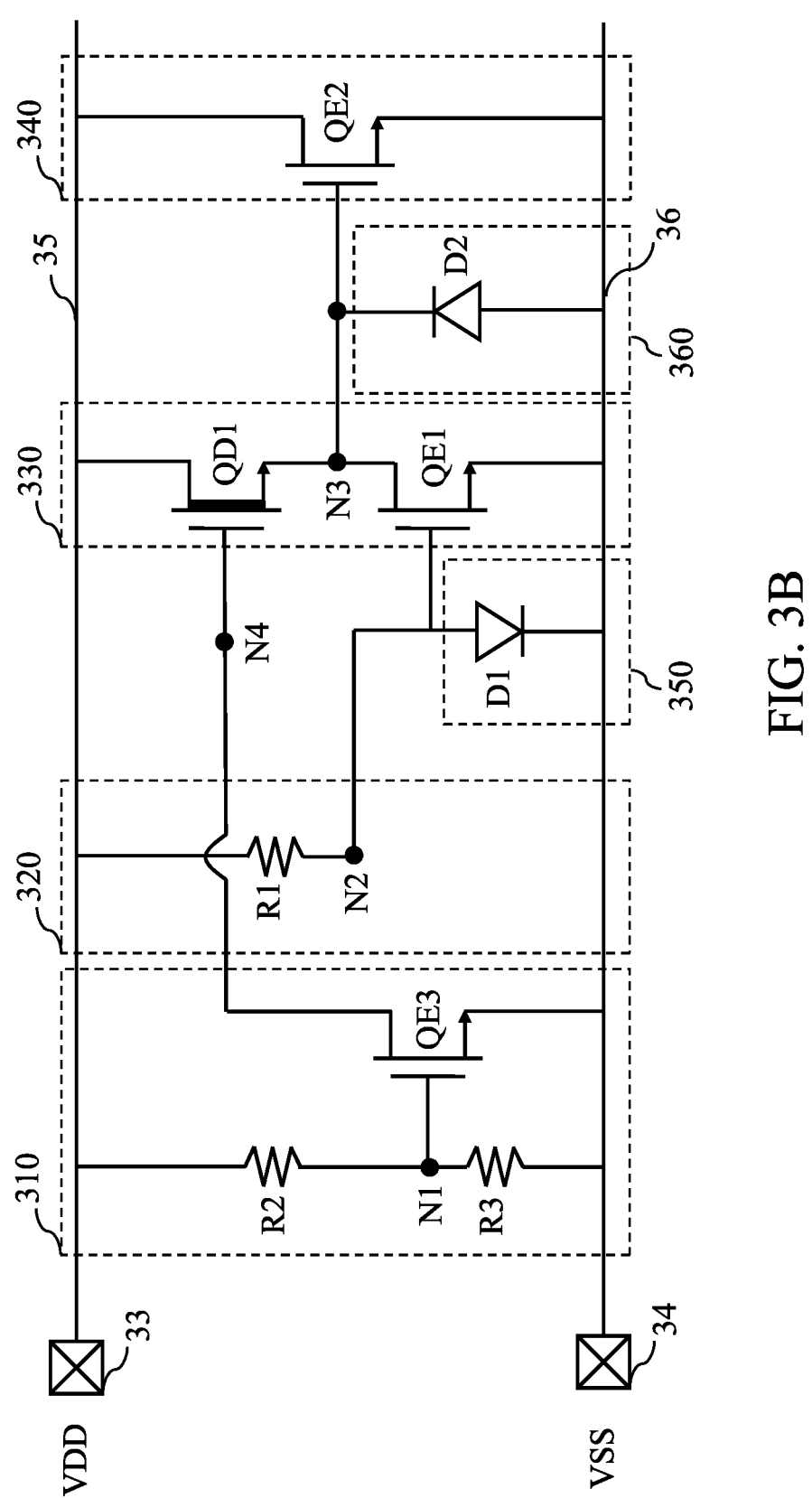
FIG. 3B is an equivalent schematic diagram of the ESD clamp circuit in FIG. 3A during the normal DC operation mode.

FIG. 3B is an equivalent schematic diagram of the ESD clamp circuit in FIG. 3A during the normal DC operation mode.

Figure 3C:
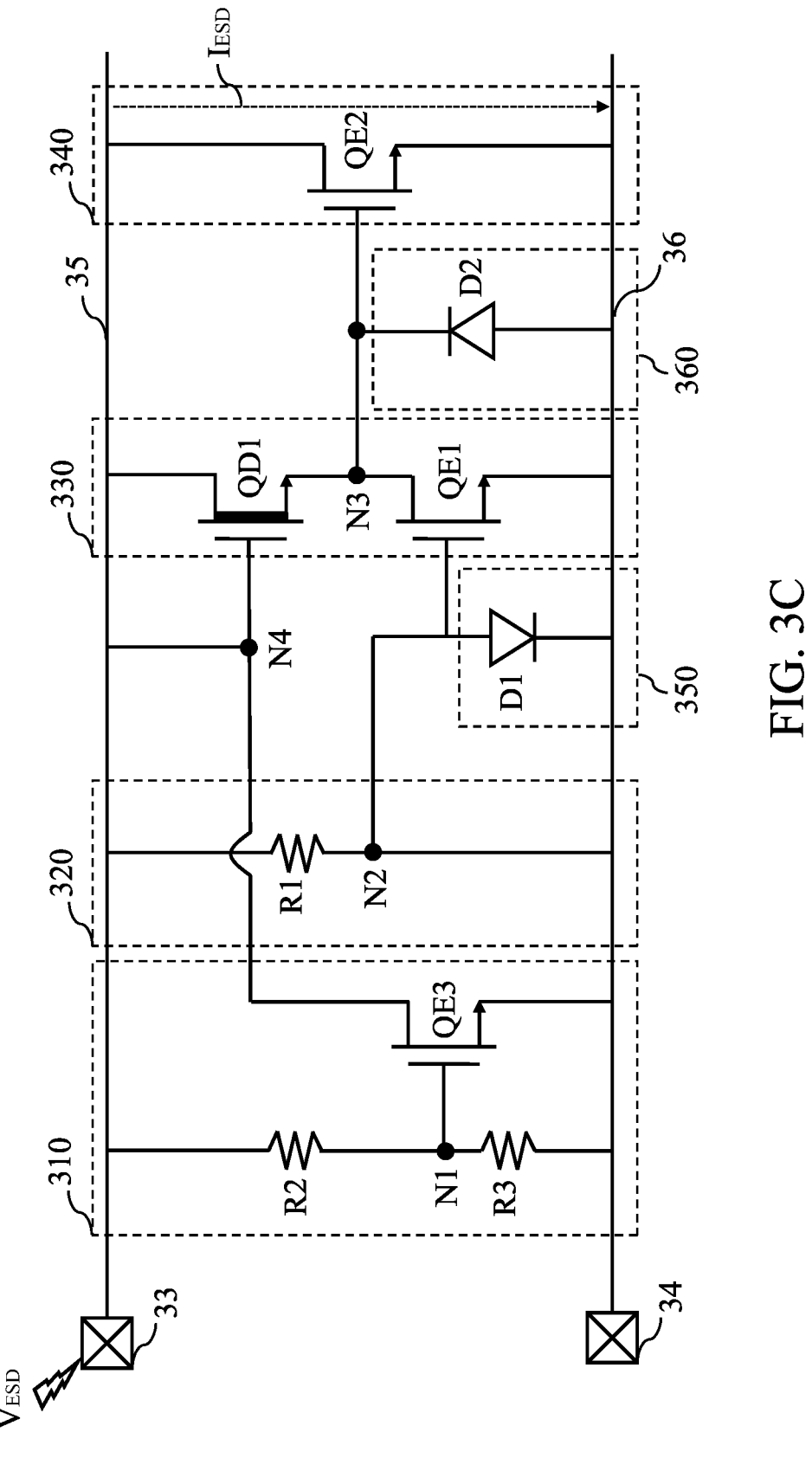
FIG. 3C is another equivalent schematic diagram of the ESD clamp circuit in FIG. 3A during positive zapping of an ESD event.
Figure 3D:
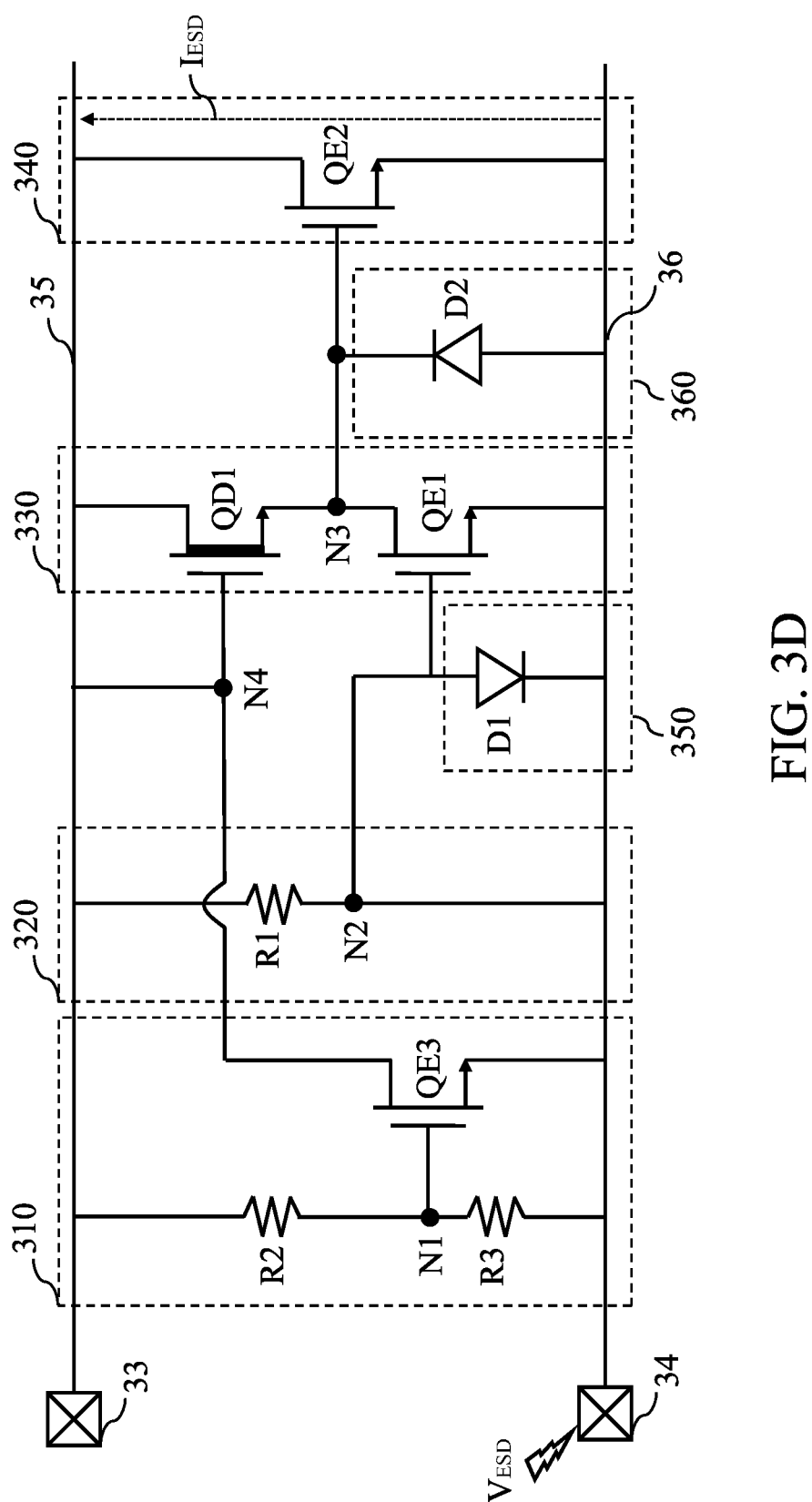
FIG. 3D is yet another equivalent schematic diagram of the ESD clamp circuit in FIG. 3A during negative zapping of an ESD event.

In some embodiments, during the normal DC operation mode of the ESD clamp circuit 300, where the power supply voltages VDD and VSS are provided to the ESD clamp circuit 300 respectively via terminal 33 and 34, the capacitors C1 and C2 can be deemed as open circuits, and the capacitors C1 and C2 are thus omitted from FIG. 3B for simplicity. In addition, since the HEMT QE4 is in a diode-connected configuration, the HEMT QE4 can be represented by diode D1 with an anode electrically connected to node N2 and a cathode electrically connected to terminal 34. Since the HEMT QE5 is in a reverse diode-connected configuration, the HEMT QE5 can be represented by diode D2 with an anode electrically connected to terminal 34 and a cathode electrically connected to node N3. For simplicity, the HEMTs QE4 and QE5 in FIGS. 3B to 3D are represented by the diodes D1 and D2, respectively.

During the normal DC operation mode of the ESD clamp circuit 300, the bias voltage VN1 at node N1, generated by the voltage divider including the resistors R2 and R3, may be a positive voltage that can enable the HEMT QE3. Accordingly, the voltage at node N4 is pulled down to the power supply voltage VSS (e.g., a large negative voltage), thereby turning off the HEMT QD1.

At this time, the power supply voltage VDD is transferred to node N2 through the resistor R1, but the voltage at node N2 is clamped by the stack rectifier 350 to a specific voltage level that can enable the HEMT QE1. Accordingly, the voltage at node N3 is pulled down to the power supply voltage VSS. In addition, the rectifier 360 can be regarded as a diode with an anode electrically connected to terminal 34 and a cathode electrically connected to node N3. Consequently, the rectifier 360 remains inactive during the normal DC operation mode of the ESD clamp circuit 300.

It should be noted that, during the normal DC operation mode of the ESD clamp circuit 300, the HEMT QD1 is turned off and the HEMT QE1 is turned on. This causes the voltage at node N3, which serves as the gate of the big HEMT QE2, to be pulled down to the power supply voltage VSS, thereby turning off the big HEMT QE2. Therefore, no current flows from terminal 33 to terminal 34 through the big HEMT QE2, thereby reducing power consumption of the ESD clamp circuit 300 during the normal DC operation mode.

FIG. 3C is another equivalent schematic diagram of the ESD clamp circuit in FIG. 3A during positive zapping of an ESD event. FIG. 3D is yet another equivalent schematic diagram of the ESD clamp circuit in FIG. 3A during negative zapping of an ESD event.

Since an ESD event can be considered as an AC voltage signal having a very high frequency, the capacitors C1 and C2 can be regarded as being shorted during positive zapping or negative zapping of an ESD event, where the ESD event occurs at terminal 33 or 34, respectively. It should be noted that during the ESD mode of the ESD clamp circuit 300, power supply voltages VDD and VSS are not provided to terminals 33 and 34, respectively.

When power supply voltages VDD and VSS are provided to terminals 33 and 34, the ESD clamp circuit 300 will enter the ESD mode. Please refer to FIG. 3C. In some embodiments, during positive zapping of an ESD event, where the ESD event (e.g., $V_{ESD}$) occurs at terminal 33 as shown in FIG. 3C, since capacitor C2 is considered as a shorted conductive wire, the voltage $V_{ESD}$ (i.e., a very high voltage) of the ESD event will be transferred to node N4, which serves as the gate of HEMT QD1. In other words, capacitor C2 may be regarded as a voltage pull-up device to pull up the voltage at node N4 to the voltage $V_{ESD}$ when an ESD event occurs. As a result, the HEMT QD1 is turned on, and the voltage $V_{ESD}$ will be transferred to node N3, which serves as the gate of the big HEMT QE2, through the HEMT QD1. More specifically, since the drain-source voltage (i.e., VDS) of the HEMT QD1 is very low, the voltage VN3 at node N3 is very close to the voltage $V_{ESD}$. Therefore, the big HEMT QE2 is able to provide a full-swing capability, resulting in a higher discharge current IESD from terminal 33 to terminal 34.

Please refer to FIG. 3D. In some embodiments, during negative zapping of an ESD event, the ESD event (e.g., $V_{ESD}$) occurs at terminal 34 as shown in FIG. 3D. In this situation, the voltage $V_{ESD}$ of the ESD event can be transferred to node N3 minus the threshold voltage of diode D2, where node N3 serves as the gate of the big HEMT QE2. Since the voltage VN3 at node N3 is very close to the voltage $V_{ESD}$, the big HEMT QE2 is turned on to provide a full-swing capability, resulting in a higher discharge current IESD from terminal 34 to terminal 33.

Therefore, the ESD clamp circuit 300 shown in FIG. 3A can prevent the internal circuitry 11 of the integrated circuit from damage caused by voltage overshot surge during the component switching or electrostatic discharge surge using GaN-based E-mode and D-mode HEMTs.

Figure 4:
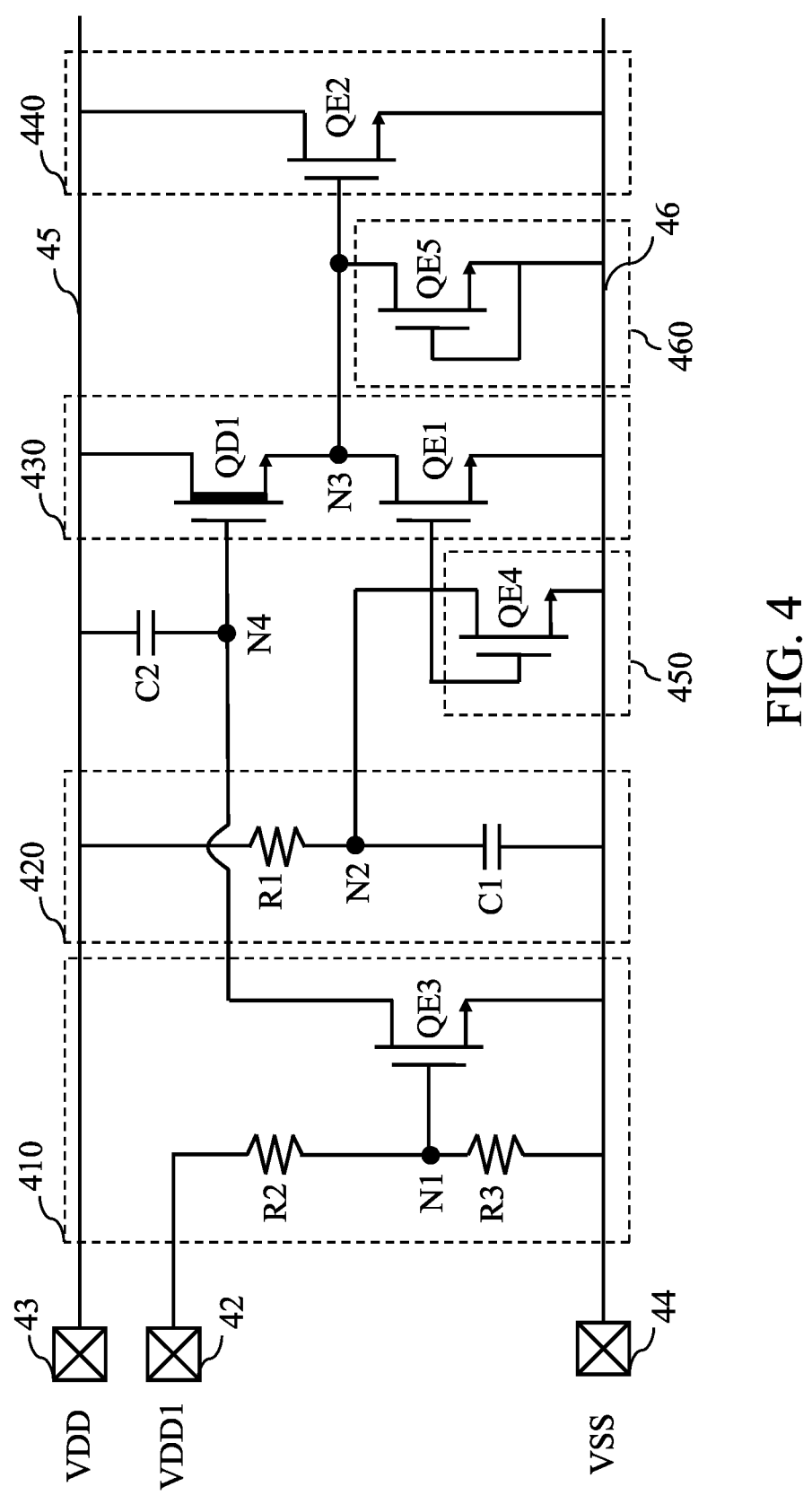
FIG. 4 is a schematic diagram of an ESD clamp circuit in accordance with yet another embodiment of the present disclosure.

FIG. 4 is a schematic diagram of an ESD clamp circuit in accordance with yet another embodiment of the present disclosure.

The ESD clamp circuit 400 shown in FIG. 4 may be similar to the ESD clamp circuit 300 shown in FIG. 3A, with the difference therebetween that the voltage divider, which includes resistors R2 and R3, in the control circuit 410 is supplied with power supply voltages VDD1 and VSS respectively via terminals 42 and 44, where the power supply voltage VDD1 is independent from the power supply voltage VDD. More specifically, since the power supply voltages VDD and VDD1 can be controlled separately, the voltage VN1 at node N1 can be controlled at a lower voltage level that is capable of turning on the HEMT QE3, and thus the current flowing through the HEMT QE3 is lower, thereby reducing the power consumption of the ESD clamp circuit 400.

Figure 5:
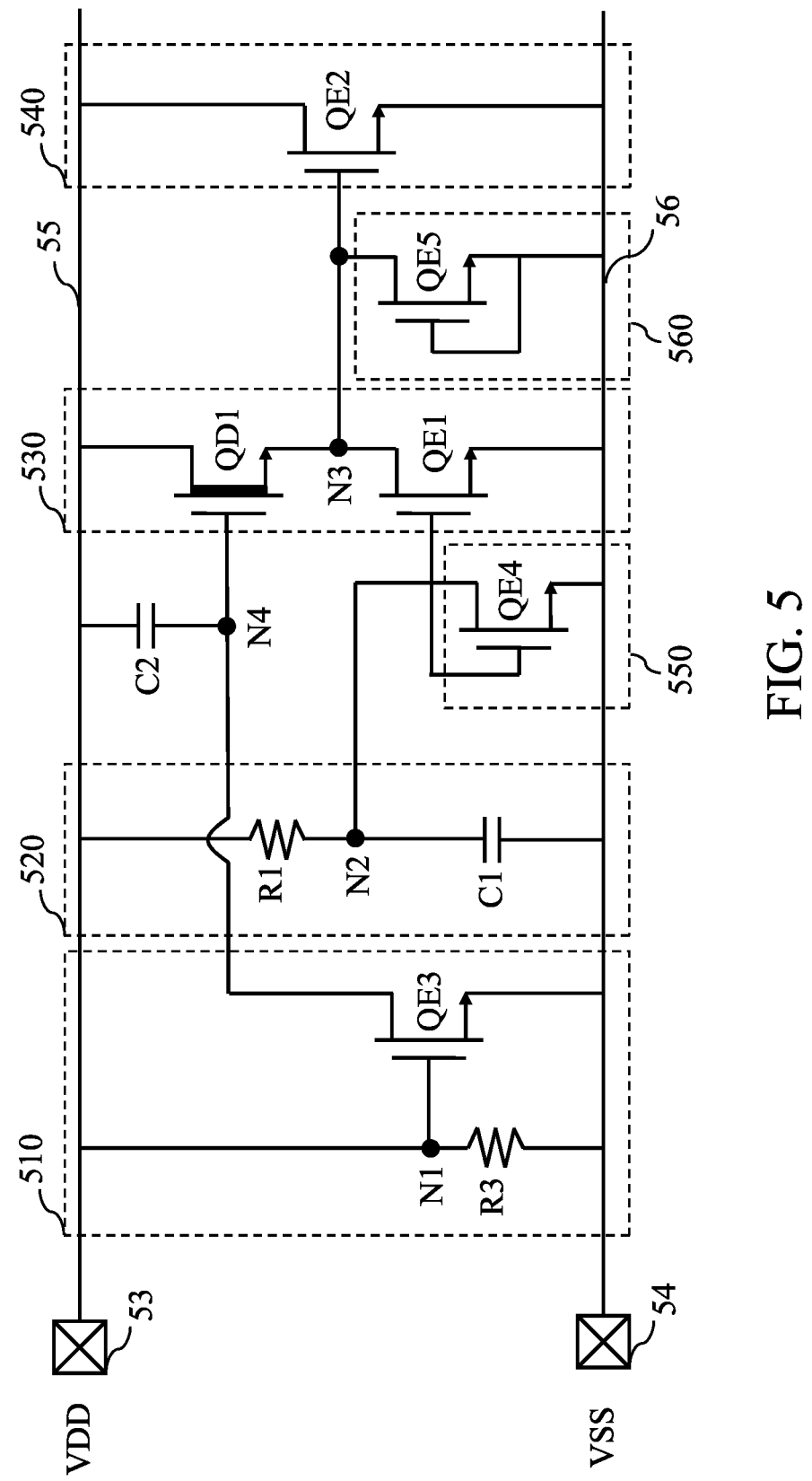
FIG. 5 is a schematic diagram of an ESD clamp circuit in accordance with still another embodiment of the present disclosure.

FIG. 5 is a schematic diagram of an ESD clamp circuit in accordance with still another embodiment of the present disclosure.

The ESD clamp circuit 500 shown in FIG. 5 may be similar to the ESD clamp circuit 300 shown in FIG. 3A, with the difference therebetween that resistor R2 is removed from the control circuit 510. In other words, node N1 is electrically connected to terminal 54 through power rail 55. This can ensure that the HEMT QE3 is turned on to pull down the voltage at node N4 so as to turn off the HEMT QD1 during the normal DC operation mode of the ESD clamp circuit 500.

Figure 6:
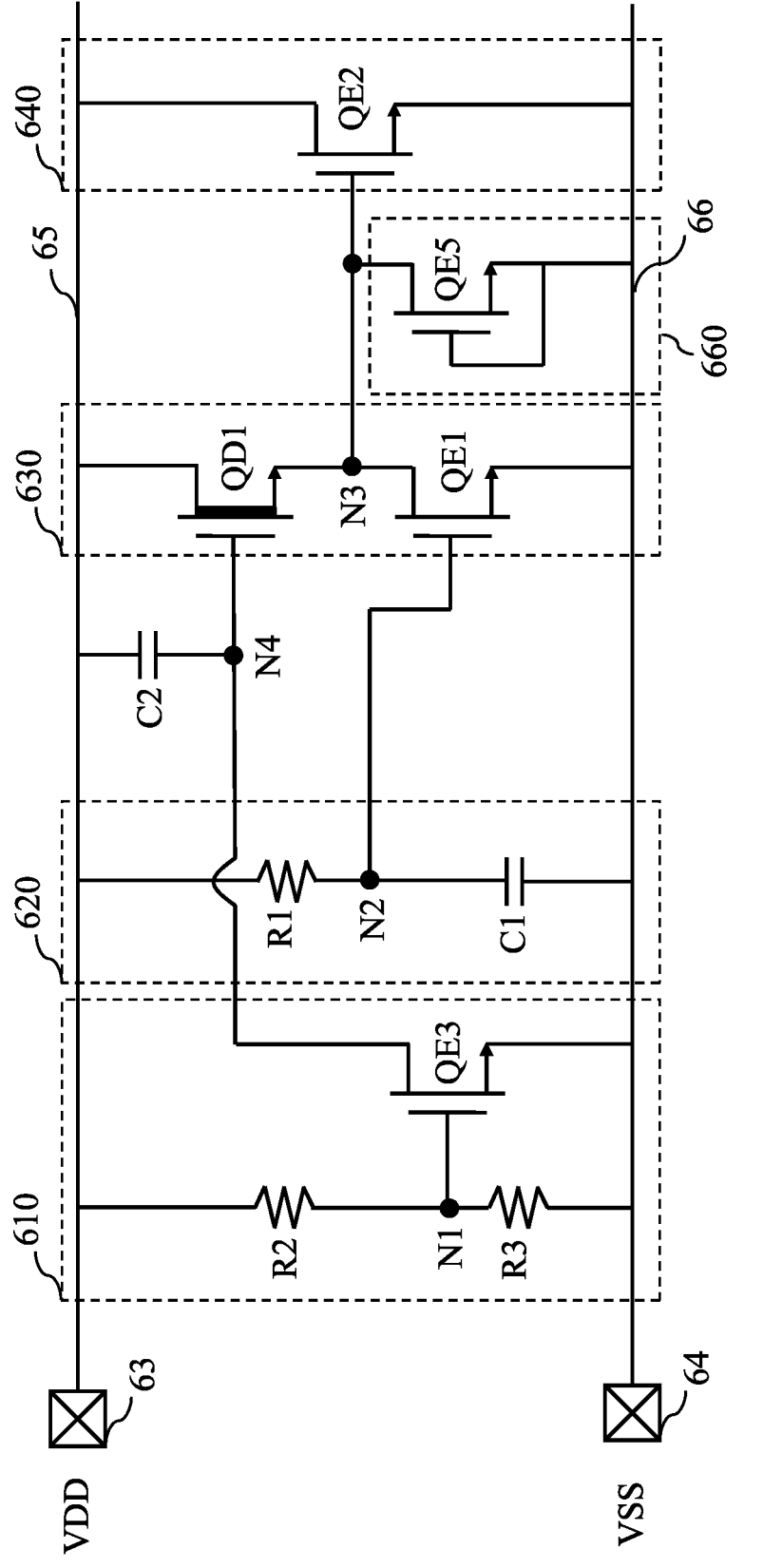
FIG. 6 is a schematic diagram of an ESD clamp circuit in accordance with still another embodiment of the present disclosure.

FIG. 6 is a schematic diagram of an ESD clamp circuit in accordance with still another embodiment of the present disclosure.

The ESD clamp circuit 600 shown in FIG. 6 may be similar to the ESD clamp circuit 300 shown in FIG. 3A, with the difference therebetween that the stack rectifier 350 shown in FIG. 3A is omitted from FIG. 6. For example, the power supply voltage VDD can be transferred to node N2, which serves as the gate of the HEMT QE1, during the normal DC operation mode of the ESD clamp circuit 600. This can ensure that the HEMT QE1 is turned on to pull down the voltage VN3 at node N3, which serves as the gate of the big HEMT QE2, and the big HEMT QE2 is turned off during the normal DC operation mode of the ESD clamp circuit 600.

Figure 7:
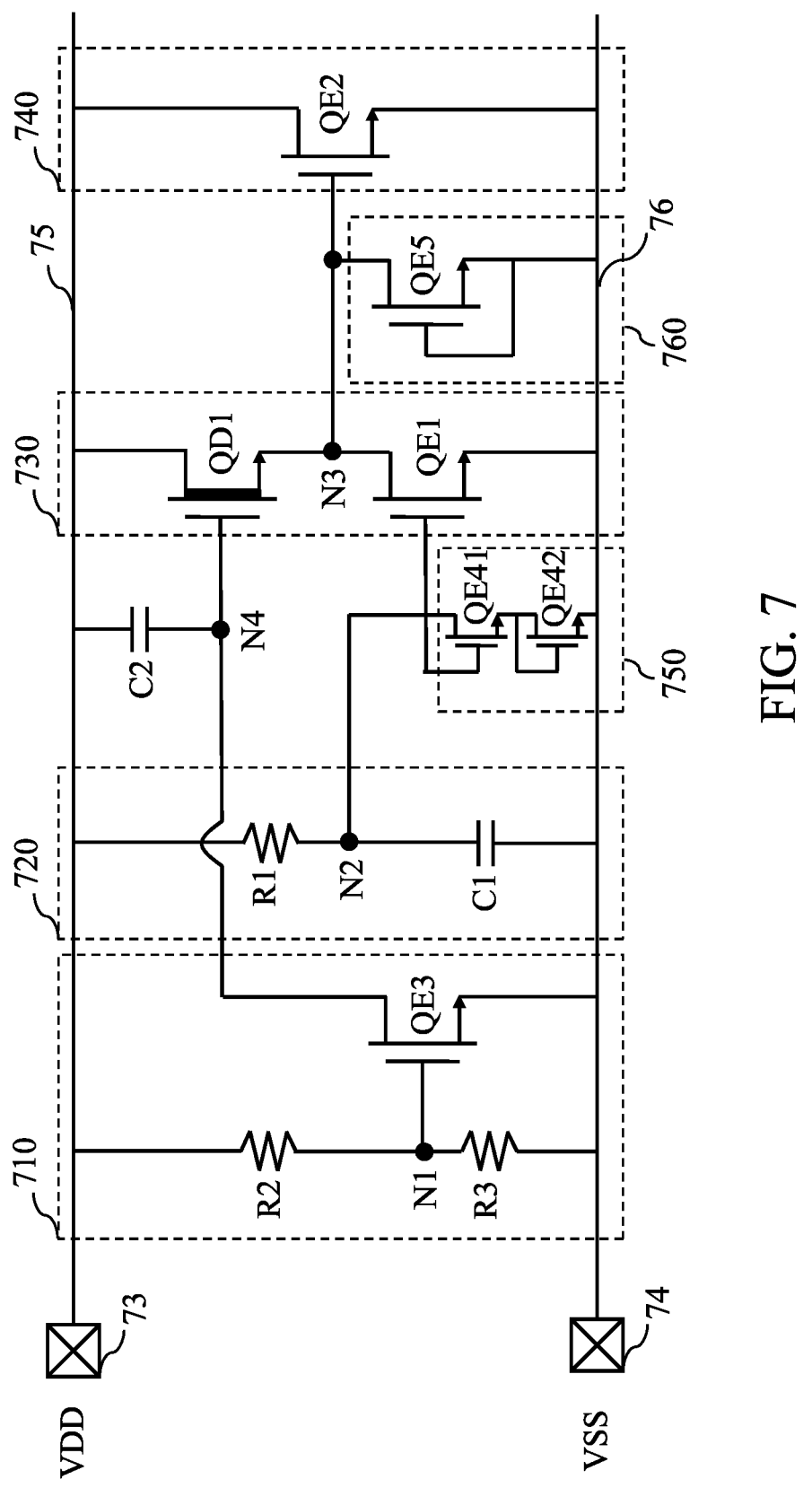
FIG. 7 is a schematic diagram of an ESD clamp circuit in accordance with still another embodiment of the present disclosure.

FIG. 7 is a schematic diagram of an ESD clamp circuit in accordance with still another embodiment of the present disclosure.

The ESD clamp circuit 700 shown in FIG. 7 may be similar to the ESD clamp circuit 300 shown in FIG. 3A, with the difference therebetween that there are two HEMTs QE41 and QE42 in the stack rectifier 750. Accordingly, the HEMTs QE41 and QE42 in the stack rectifier 750 may be equivalent to two diodes connected in series, and each diode can be referred to as diode D1 shown in FIG. 3B. It should be noted that the stack rectifier 750 may include one or more HEMTs (e.g., E-mode N-type HEMTs) arranged in a cascoded architecture, and each HEMT can be regarded as one rectifier stage, and is in a diode-connected configuration. The number of rectifier stages in the stack rectifier 750 can be appropriately designed to match the threshold voltage of the HEMT QE1 of the driving circuit 730 during the normal DC operation mode of the ESD clamp circuit 700. For simplicity, two HEMTs QE41 and QE42 are shown in FIG. 7.

Figure 8:
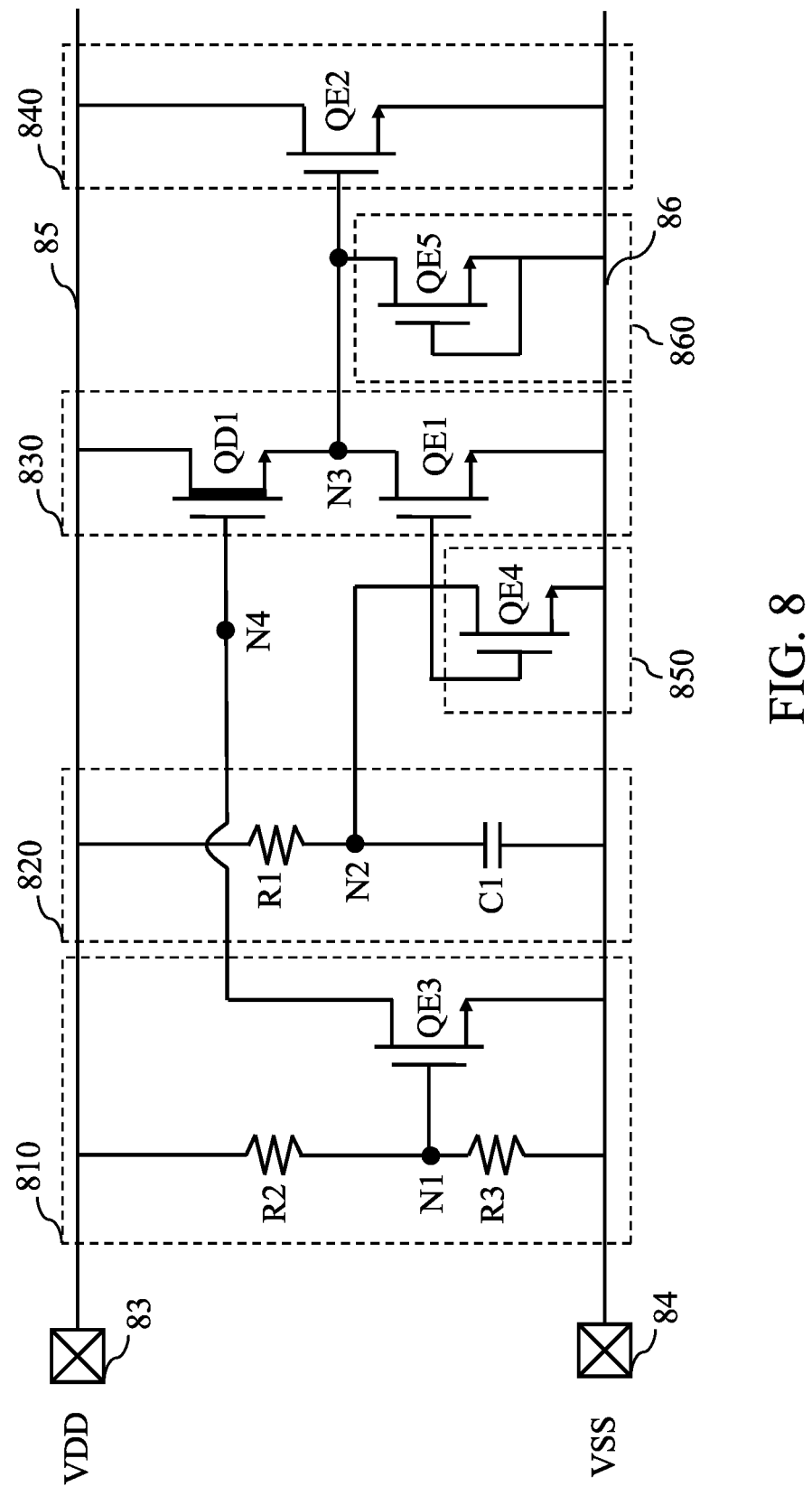
FIG. 8 is a schematic diagram of an ESD clamp circuit in accordance with still another embodiment of the present disclosure.

FIG. 8 is a schematic diagram of an ESD clamp circuit in accordance with still another embodiment of the present disclosure.

The ESD clamp circuit 800 shown in FIG. 8 may be similar to the ESD clamp circuit 300 shown in FIG. 3A, with the difference therebetween that the capacitor C2 is omitted from the ESD clamp circuit 800 shown in FIG. 8. Accordingly, the operations of the ESD clamp circuit 800 shown in FIG. 8 during the normal DC operation mode may be similar to those of the ESD clamp circuit 300 shown in FIG. 3A.

Figure 9:
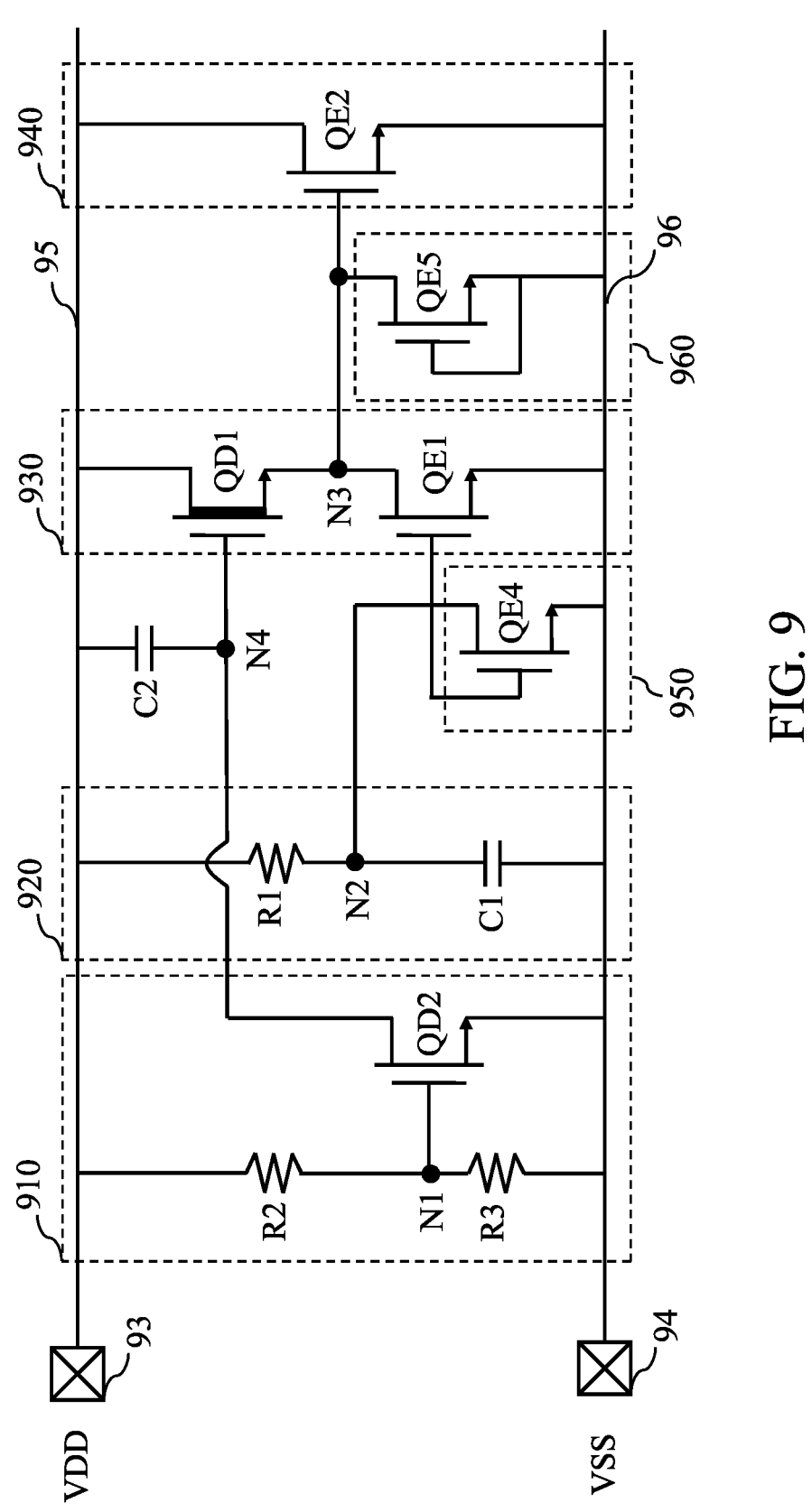
FIG. 9 is a schematic diagram of an ESD clamp circuit in accordance with still another embodiment of the present disclosure.

FIG. 9 is a schematic diagram of an ESD clamp circuit in accordance with still another embodiment of the present disclosure.

The ESD clamp circuit 900 shown in FIG. 9 may be similar to the ESD clamp circuit 300 shown in FIG. 3A, with the difference therebetween that the HEMT QE2 of the control circuit 310 in FIG. 3A is replaced by a D-mode N-type HEMT QD2 in the control circuit 910 in FIG. 9. It should be noted that the HEMT QD2 has a negative threshold voltage and remains in the ON state when its gate is connected to the ground voltage or left floating. Accordingly, the resistors R2 and R3 in FIG. 9 can be appropriately designed so that the HEMT QD2 is turned on during the normal DC operation mode of the ESD clamp circuit 900. It should be noted that the variations mentioned in the embodiments of FIG. 4 and FIG. 5 can also be applied to the control circuit 910 in some embodiments. For example, the resistor R2 may be connected to another power supply voltage VDD1 that is independent from the power supply voltage VDD, as described in the embodiment of FIG. 4. Alternatively, the resistor R2 can be omitted when there is no reliability concern for the HEMT QD2, as described in the embodiment of FIG. 5.

Figure 10:
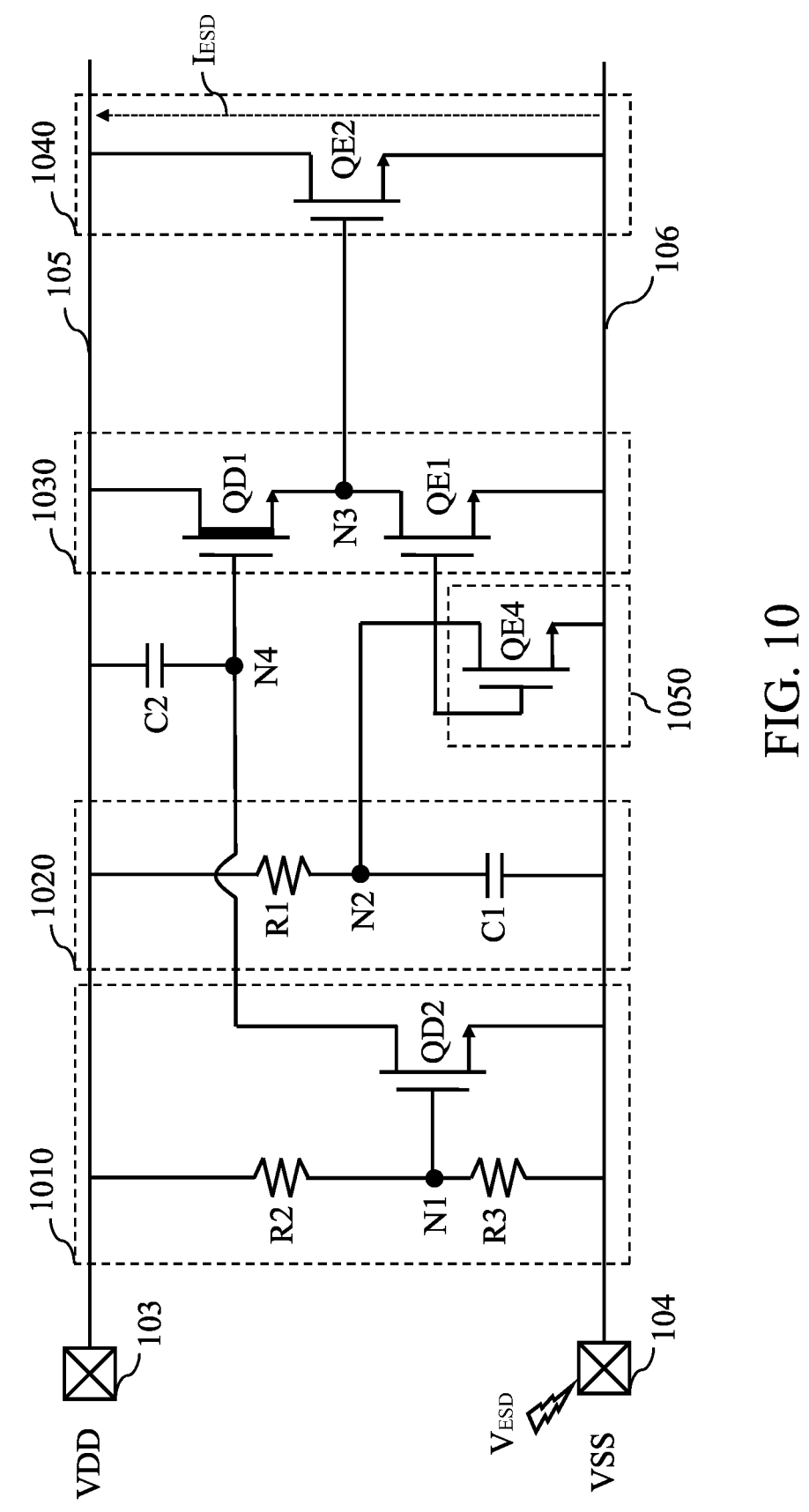
FIG. 10 is a schematic diagram of an ESD clamp circuit in accordance with still another embodiment of the present disclosure.

FIG. 10 is a schematic diagram of an ESD clamp circuit in accordance with still another embodiment of the present disclosure.

The ESD clamp circuit 1000 shown in FIG. 10 may be similar to the ESD clamp circuit 300 shown in FIG. 3A, with the difference therebetween that the rectifier 360 shown in FIG. 3A is omitted from the ESD clamp circuit 1000 shown in FIG. 10. Accordingly, the operations of the ESD clamp circuit 1000 shown in FIG. 10 during the normal DC operation mode may be similar to those of the ESD clamp circuit 300 shown in FIG. 3A. However, the operations of the ESD clamp circuit 1000 shown in FIG. 10 during the ESD mode may be slightly different from those of the ESD clamp circuit 300 shown in FIG. 3A. For example, during negative zapping of an ESD event, where the ESD event occurs at terminal 104, the voltage $V_{ESD}$ may be transferred to node N2 since the capacitor C1 can be regarded as a conductive wire. Thus, the HEMT QE1 is turned on, and the voltage $V_{ESD}$ can be transferred to node N3, which serves as the gate of the big HEMT QE2, through the HEMT QE1. Accordingly, the big HEMT QE2 is turned on, and a discharge current IESD may flow from terminal 104 to terminal 103 through the big HEMT QE2.

An aspect of the present disclosure provides a semiconductor device which includes a control circuit, a driving circuit, a voltage pull-up device, and a discharging circuit. The control circuit is coupled between a first terminal and a second terminal of the integrated circuit, and configured to provide a first voltage at a first node. The driving circuit is electrically connected to the control circuit at the first node, and configured to provide a trigger signal at a second node in response to an electrostatic discharge (ESD) event occurring at the first terminal or the second terminal. The voltage pull-up device is coupled between the first terminal and the first node, and configured to pull up the first voltage at the first node in response to the ESD event occurring at the first terminal. The discharging circuit is electrically connected to the second node, and coupled between the first terminal and the second terminal.

Another aspect of the present disclosure provides an electrostatic discharge (ESD) clamp circuit, which includes a trigger circuit, a discharging circuit, and a driving circuit. The trigger circuit includes a first resistor and a first capacitor. The first resistor is coupled between a first terminal of the ESD clamp circuit and a first node. The first capacitor is coupled between the first node and a second terminal of the ESD clamp circuit. The discharging circuit includes a first high-electron-mobility transistor (HEMT) having a gate electrically connected to a second node, a drain electrically connected the first terminal, and a source electrically connected to the second terminal. The driving circuit includes a high-side HEMT and a low-side HEMT. The high-side HEMT has a gate electrically connected to a third node, a drain electrically connected to the first terminal, and a source electrically connected to the first node. The low-side HEMT has a gate electrically connected to an output terminal of the trigger circuit, a drain electrically connected to the second node, and a source electrically connected to the second terminal.

Yet another aspect of the present disclosure provides an electrostatic discharge (ESD) clamp circuit, which includes a resistance-capacitance (RC) trigger circuit, a discharging circuit, and a driving circuit. The RC trigger circuit includes a high-side resistor and a low-side capacitor coupled to a first terminal and a second terminal, respectively, of the ESD clamp circuit. The discharging circuit includes a first high-electron-mobility transistor (HEMT) having a gate, a drain electrically connected the first terminal, and a source electrically connected to the second terminal. The driving circuit is electrically connected between the RC trigger circuit and the gate of the first HEMT. The driving circuit is configured to provide a first bias voltage to turn off the first HEMT during a normal direct-current (DC) operation mode of the ESD clamp circuit, and provide a second bias voltage to turn on the first HEMT during an ESD mode of the ESD clamp circuit, wherein the second bias voltage is approximately equal to a first voltage of an ESD event occurring at the first terminal or the second terminal.

The methods and features of the present disclosure have been sufficiently described in the provided examples and descriptions. It should be understood that any modifications or changes without departing from the spirit of the present disclosure are intended to be covered in the protection scope of the present disclosure.

Moreover, the scope of the present application is not intended to be limited to the particular embodiments of the process, machine, manufacture, and composition of matter, means, methods and steps described in the specification. As those skilled in the art will readily appreciate from the present disclosure, processes, machines, manufacture, composition of matter, means, methods or steps presently existing or later to be developed, that perform substantially the same function or achieve substantially the same result as the corresponding embodiments described herein, can be utilized according to the present disclosure.

Accordingly, the appended claims are intended to include within their scope processes, machines, manufacture, compositions of matter, means, methods or steps. In addition, each claim constitutes a separate embodiment, and the combination of various claims and embodiments are within the scope of the present disclosure.

What is claimed is:

1. A semiconductor device, comprising:

a control circuit, coupled between a first terminal and a second terminal of the semiconductor device, and configured to provide a first voltage at a first node;

a driving circuit, electrically connected to the control circuit at the first node, and configured to provide a trigger signal at a second node in response to an electrostatic discharge (ESD) event occurring at the first terminal or the second terminal;

a voltage pull-up device, coupled between the first terminal and the first node, and configured to pull up the first voltage at the first node in response to the ESD event occurring at the first terminal; and a discharging circuit, electrically connected to the second node, and coupled between the first terminal and the second terminal, wherein the control circuit comprises:

a first high-electron-mobility transistor (HEMT), having a gate connected to a third node, a drain electrically connected to the first node, and a source electrically connected to the second terminal; and a voltage divider, configured to divide the first power supply voltage to generate a first bias voltage at the third node.

2. The semiconductor device of claim 1, wherein when a first power supply voltage and a second power supply voltage are respectively provided to the first terminal and the second terminal, the control circuit is further configured to pull down the first voltage at the first node to the second power supply voltage, wherein the first power supply voltage is positive, and the second power supply voltage is negative or a ground voltage.

3. The semiconductor device of claim 1, wherein the voltage pull-up device is a first capacitor.

4. The semiconductor device of claim 3, further comprising:

a trigger circuit, comprising:

a first resistor, coupled between the first terminal and a fourth node; and a second capacitor, coupled between the fourth node and the second terminal.

5. The semiconductor device of claim 4, wherein the driving circuit comprises:

a second HEMT, comprising a gate electrically connected to the fourth node, a drain electrically connected to the second node; and a source electrically connected to the second terminal; and a third HEMT, comprising a gate electrically connected to the first node, a drain electrically connected to the first terminal, and a source electrically connected to the fourth node.

6. The semiconductor device of claim 5, wherein the second HEMT is an enhancement-mode N-type HEMT, and the third HEMT is a depletion-mode N-type HEMT.

7. The semiconductor device of claim 6, wherein the discharging circuit comprises a fourth HEMT having a gate electrically connected to the first node, a drain electrically connected to the first terminal, and a source electrically connected to the second terminal.

8. The semiconductor device of claim 7, further comprising:

a stack rectifier, comprising one or more rectifier stages arranged in a cascode architecture, wherein each rectifier stage comprises a diode-connected HEMT, wherein an overall threshold voltage of the stack rectifier is higher than a threshold voltage of the second HEMT.

9. The semiconductor device of claim 8, further comprising:

a rectifier, comprising:

a fifth HEMT, comprising a gate electrically connected to the second terminal, a drain electrically connected to the first node, and a source electrically connected to the second terminal.

10. The semiconductor device of claim 9, wherein in response to the ESD event occurring at the first terminal, a second voltage of the ESD event is transferred to the first node through the first capacitor to turn on the third HEMT, and the second voltage of the ESD event is transferred to the second node through the third HEMT to turn on the fourth HEMT, so the discharge current flows from the first terminal to the second terminal through the fourth HEMT to discharge the electric charges of the ESD event.

11. The semiconductor device of claim 9, wherein in response to the ESD event occurring at the second terminal, a second voltage of the ESD event is transferred to the first node through the fifth HEMT to turn on the fourth HEMT, so the discharge current flows from the second terminal to the first terminal through the fourth HEMT to discharge the electric charges of the ESD event.

12. The semiconductor device of claim 11, wherein the first resistor is implemented using a two-dimensional electron gas (2DEG) between an AlGaN—GaN heterojunction of a sixth HEMT fabricated in a front-end of line (FEOL) process, wherein the first capacitor and the second capacitor are implemented by a seventh HEMT and an eighth HEMT in the FEOL process, and a drain and a source of the seventh HEMT are electrically connected, and a drain and a source of the eighth HEMT are electrically connected.

13. The semiconductor device of claim 11, wherein the first resistor is implemented using silicon-chromium or titanium nitride in a back-end of line (BEOL) process, and the first capacitor and the second capacitor are implemented using a metal-insulator-metal (MIM) or metal-oxide-metal (MOM) technique in the BEOL processing.

14. An electrostatic discharge (ESD) clamp circuit, comprising:

a trigger circuit, comprising:

a first resistor, coupled between a first terminal of the ESD clamp circuit and a first node; and a first capacitor, coupled between the first node and a second terminal of the ESD clamp circuit;

a discharging circuit, comprising:

a first high-electron-mobility transistor (HEMT), having a gate electrically connected to a second node, a drain electrically connected the first terminal, and a source electrically connected to the second terminal;

a driving circuit, comprising:

a high-side HEMT, having a gate electrically connected to a third node, a drain electrically connected to the first terminal, and a source electrically connected to the first node; and a low-side HEMT, having a gate electrically connected to an output terminal of the trigger circuit, a drain electrically connected to the second node, and a source electrically connected to the second terminal; and a control circuit, coupled between the first terminal and the second terminal, wherein the control circuit comprises:

a second HEMT, having a gate connected to a fourth node, a drain electrically connected to the third node, and a source electrically connected to the second terminal; and a voltage divider, configured to divide a first power supply voltage to generate a first bias voltage at the fourth node.

15. The ESD clamp circuit of claim 14, wherein the first HEMT and the low-side HEMT are implemented using enhancement-mode N-type HEMTs, and a total width of the first HEMT is greater than that of the low-side HEMT, wherein the high-side HEMT is implemented using a depletion-mode N-type HEMT, and a total width of the high-side HEMT is smaller than that of the low-side HEMT.

16. The ESD clamp circuit of claim 14, wherein during a normal direct-current (DC) operation mode of the ESD clamp circuit, the first power supply voltage and a second power supply voltage are respectively provided to the first terminal and the second terminal, and the ESD clamp circuit further comprises:

a second capacitor, coupled between the first terminal and the third node, and configured to pull up the first voltage at the third node to a second voltage of an ESD event in response to the ESD event occurring at the first terminal.

17. The ESD clamp circuit of claim 14, further comprising:

a stack rectifier, comprising one or more second HEMTs arranged in a cascode architecture, wherein each second HEMT is in a first diode-connected configuration; and a rectifier, comprising: a third HEMT in a second diode-connected configuration opposite to the first diode-connected configuration.

18. An electrostatic discharge (ESD) clamp circuit, comprising:

a resistance-capacitance (RC) trigger circuit, comprising: a high-side resistor and a low-side capacitor coupled to a first terminal and a second terminal, respectively, of the ESD clamp circuit;

a discharging circuit, comprising: a first high-electron-mobility transistor (HEMT), having a gate, a drain electrically connected the first terminal, and a source electrically connected to the second terminal;

a driving circuit, electrically connected between the RC trigger circuit and the gate of the first HEMT;

a stack rectifier, comprising one or more second HEMTs arranged in a cascode architecture, wherein each second HEMT is in a first diode-connected configuration; and a rectifier, comprising: a third HEMT in a second diode-connected configuration opposite to the first diode-connected configuration, wherein the driving circuit is configured to provide a first bias voltage to turn off the first HEMT during a normal direct-current (DC) operation mode of the ESD clamp circuit, and provide a second bias voltage to turn on the first HEMT during an ESD mode of the ESD clamp circuit, wherein the second bias voltage is approximately equal to a first voltage of an ESD event occurring at the first terminal or the second terminal.

19. The ESD clamp circuit of claim 18, wherein in response to the ESD event occurring at the second terminal, the first voltage of the ESD event is transferred to the gate of the first HEMT to turn on the first HEMT to generate a discharge current flowing from the second terminal to the first terminal through the first HEMT to discharge electric charges of the ESD event.

20. The ESD clamp circuit of claim 18, further comprising:

a control circuit, coupled between the first terminal and the second terminal of the semiconductor device, and configured to provide a first voltage to the driving circuit at a first node, wherein the control circuit comprises:

a fourth HEMT, having a gate connected to a second node, a drain electrically connected to the first node, and a source electrically connected to the second terminal; and a voltage divider, configured to divide a power supply voltage to generate a first bias voltage at the second node.

* * * * *